(12) United States Patent
Chao et al.

(10) Patent No.: US 12,531,815 B2
(45) Date of Patent: Jan. 20, 2026

(54) SMART APPLICATION PROGRAMMING INTERFACE (API) RESOURCE SHARING FOR DISTRIBUTED SERVICE PLATFORMS

(71) Applicant: Dell Products L.P., Round Rock, TX (US)

(72) Inventors: Ching-Yun Chao, Austin, TX (US); James O. Pendergraft, Pittsboro, NC (US)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 18/625,540

(22) Filed: Apr. 3, 2024

(65) Prior Publication Data
US 2025/0317406 A1 Oct. 9, 2025

(51) Int. Cl.
*H04L 47/783* (2022.01)
*G06F 16/955* (2019.01)
*H04L 67/02* (2022.01)

(52) U.S. Cl.
CPC ........ *H04L 47/783* (2013.01); *G06F 16/9566* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 5,794,018 A | 8/1998 | Vrvilo et al. | |
| 6,526,433 B1 | 2/2003 | Chang et al. | |
| 8,788,540 B2 | 7/2014 | Schott et al. | |
| 9,152,402 B2 | 10/2015 | Scheidel et al. | |
| 9,432,399 B2 | 8/2016 | Iyengar et al. | |
| 10,558,581 B1 * | 2/2020 | Lazier | G06F 21/6218 |
| 10,606,642 B1 * | 3/2020 | Franklin | G06F 3/0482 |
| 10,795,992 B2 | 10/2020 | Dykes | |
| 2019/0007418 A1 * | 1/2019 | Cook | H04N 21/443 |
| 2019/0278851 A1 * | 9/2019 | Novak | G06F 16/951 |
| 2025/0123912 A1 * | 4/2025 | Ramakrishnan | G06Q 10/06 |

FOREIGN PATENT DOCUMENTS

GB 2530499 A * 3/2016 ......... G06F 16/2443

* cited by examiner

*Primary Examiner* — Quang N Nguyen
(74) *Attorney, Agent, or Firm* — WOMBLE BOND DICKINSON (US) LLP

(57) ABSTRACT

Methods and systems for managing data, resources, services, or the like in a distributed service system (e.g., a distributed service platform) are disclosed. Application programming interface (API) requests (e.g., API calls) containing short-form uniform resource identifiers (URI) having shared resource type names may be correctly and accurately routed to one or more resource providers (e.g., computing devices) making up the distributed service system that host instances of API(s). Such routing may be achieved even by users of the distributed service system that are not familiar with all of the instances and/or versions of APIs available on the distributed service system.

20 Claims, 5 Drawing Sheets

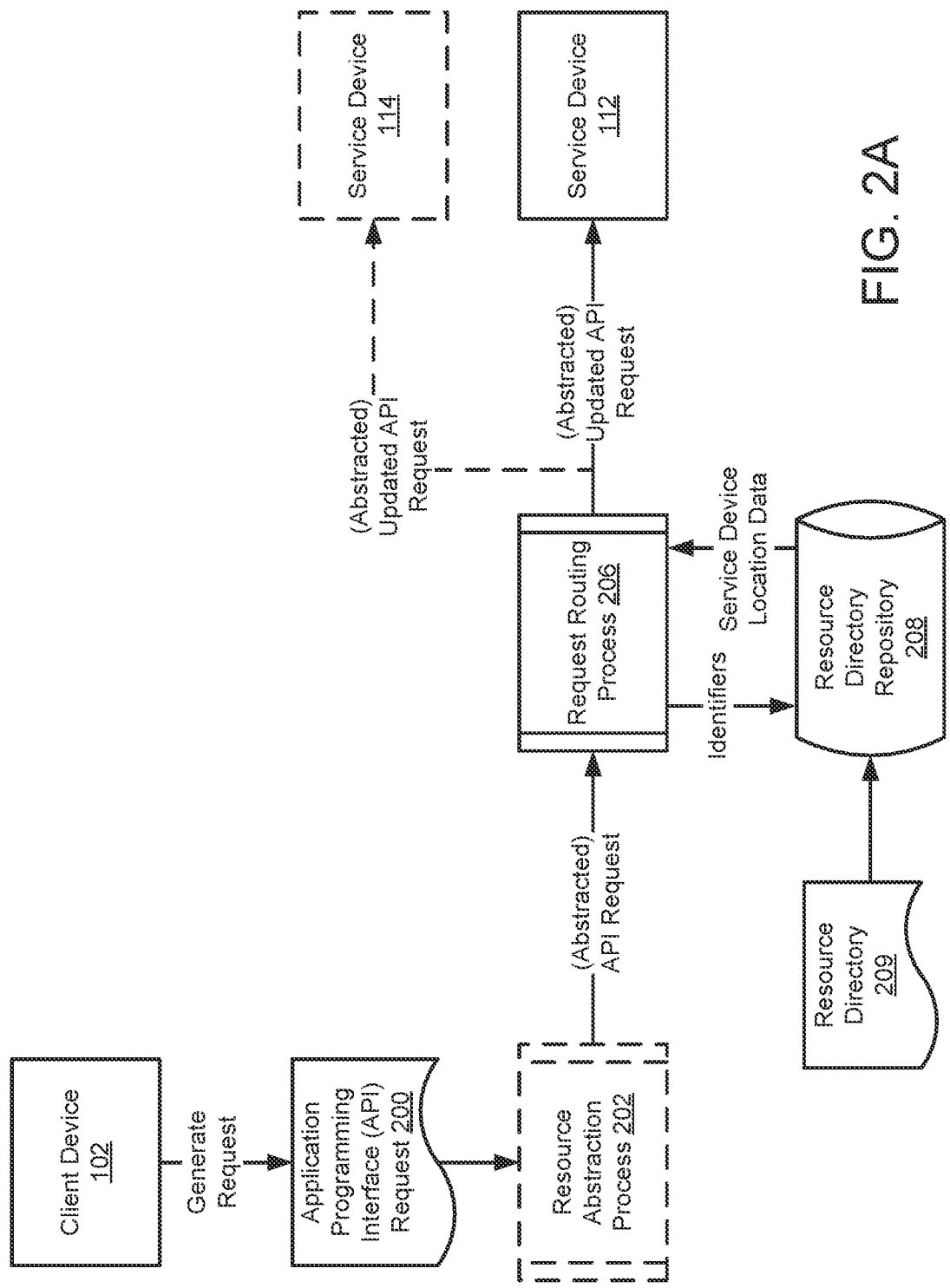

| Offer Identifier (ID) | Action | Resource Name | Resource ID | Resource Provider (Endpoint) |
|---|---|---|---|---|
| x | GET | R | a | Service Device X |
| y | GET | S | b | Service Device Y |
| y | PUT | W | c | Service Device Z |
| y | PUT | Z | d | Service Device A |
| ... | | | | |

SMART APPLICATION PROGRAMMING INTERFACE (API) RESOURCE SHARING FOR DISTRIBUTED SERVICE PLATFORMS

FIELD

Embodiments disclosed herein relate generally to resource management. More particularly, embodiments disclosed herein relate to systems and methods to manage resources across shared infrastructure.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2C show data flow diagrams in accordance with an embodiment.

DETAILED DESCRIPTION

Figure 1:
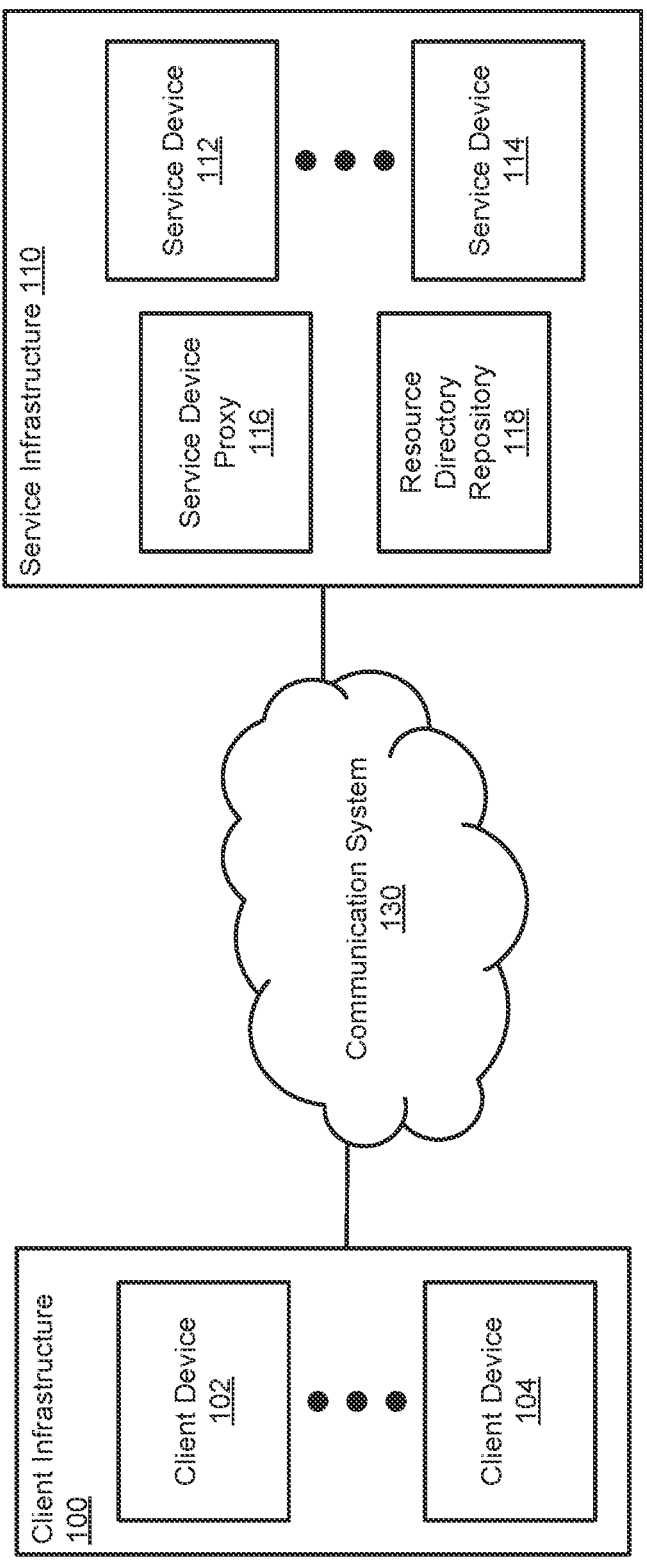
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing resources in a distributed service platform/system. To provide various computer implemented services, information from a distributed system may need to be distributed to locations where the data is processed and/or otherwise used.

To facilitate data distribution, application programming interfaces (APIs) may be utilized. The APIs may be Representational State Transfer (REST) APIs that facilitate stateless distribution of information through invocation of functions of the REST APIs. To read data, for example, a function may be invoked and a uniform resource identifier (URI) may be provided. The invoked function and URI may enable the REST API to identify relevant data and provide the relevant data in response to the request.

URIs may be presented in short or long form (e.g., a hierarchical URI design). Shorter URIs (e.g., short-form URIs) are easier to read and usually the more favored of the two options. However, for distributed service platforms that contain many services (e.g., provided by various different teams), allocating popular and common resource type names among services may cause confusion and issues with identifying the correct service to use.

For example, an entity may internally have two teams (team A and team B) that each provide different versions (e.g., a business-oriented version and an information technology (IT) oriented version) of the same service. Both teams may want to claim a popular and common resource type name such as host, virtual machine (vm), or storage-systems for use in a URI. If both teams claim the use of the resource ID "host", a member of team A will not be able to know whether he or she is correctly using her team's (team A's) version of the service when that member uses the resource ID "host" in a URI without adding additional terms to the URI that are associated with team A's service paths.

Consequently, such limitations over the use of common resource type names make it difficult for entities with larger distributed service platforms to use short-form URIs. Thus, a better, more improved, way of sharing API resources (e.g., resource IDs) is required.

To provide such an improved method for sharing API resources, a resource proxy (also referred to herein as a "service device proxy") having access to a resource directory service (also referred to herein as a "resource directory repository") may be provided. Using the information stored in the resource directory service, the resource proxy may be able to accurately forward (e.g., routes) each invoked API (e.g., each API request) to an accurate resource provider, even if the API request includes a URI including a common resource type name (e.g., "storage-systems") shared by various teams (or entities) within the distributed service platforms.

To facilitate the accurate routing of the API requests, the resource directory service may store information related to each available implementation (e.g., version) of a specific service available within the distributed service platform. The resource proxy may then compare certain keywords included in a URI such as a specific resource identifier (ID) that is unique to a specific implementation of a service to the data stored in the resource directory service to determine which resource provider should ultimately receive the API request. This way, the creator of the request (e.g., API request) does not need to know the actual path to resource provider and can confidently generate URIs using common resource type names shared by others (e.g., other individuals, teams, customers, etc. using the same distributed service platform) knowing that the request will be routed to the correct resource provider.

Additionally, prior to being routed by the resource proxy, the API request (e.g., a REST API request) may first be configured through a resource abstraction process. The resource abstraction process transforms each API request into a common metadata framework, which allows the API request to be understandable by all teams (and/or entities) using the same distributed service platform. This advantageously drives better adoption and reuse of APIs as well as leading to more effective governance and reporting withing larger, more complex distributed service platforms.

Thus, embodiments disclosed herein may address, among others, the technical problem of limited computing resources within distributed service platforms. By accurately routing API requests to the correct resource providers, mistakenly routed request may be reduced and/or completely eliminated. Accordingly, the limited computing resources of the distributed system may be preferentially used to complete requests instead of fixing erroneously routed requests, which results in a technical improvement in the use and management of the computing devices' (e.g., the computing devices making up the distributed service platforms computing resources).

In an embodiment, a method for managing resources within a distributed service platform is provided. The method may include: obtaining an application programming interface (API) request; parsing the API request to obtain request information, the request information comprising a uniform resource identifier (URI), and the URI being a short-form URI; using the request information to obtain resource provider location data from a resource directory repository; and providing the API request to one or more resource providers associated with the obtained resource provider location data for the API request to be serviced by the one or more resource providers.

The API request is a Representational State Transfer (REST) API request, and a term in the short-form URI is a shared resource type name used by at least two different entities that provide resources through the one or more resource providers.

The at least two different entities comprise a business entity and an information technology (IT) entity, and the shared resource type name is one selected from a group consisting of: host, resource, virtual machine (vm), and storage-system.

The resource directory repository stores a resource directory, the resource directory including information associated with the one or more resource providers comprising, for each of the one or more resource providers: a host name, a resource name, a resource ID (e.g., <id> in a URI such as "/rest/v1/<resource type name>/<id>"), an action type, and an offer ID. Using the request information to obtain the resource provider location data may include: matching terms included in the URI to the information associated with the one or more resource providers included in the resource directory.

The API request is an abstracted API request on which a resource abstraction process was previously applied before being obtained, the resource abstraction process modifies content within the API request to adhere to a predefined standardized format.

The resource provider location data comprises the host name and a port number of each of the one or more resource providers to which the API request is to be provided. Providing the API request to the one or more resource providers may include, for a resource provider among the one or more resource providers: updating the host name of the resource provider to the URI included in the API request to obtain an updated URI; and forwarding the API request to the resource provider of the one or more resource providers using the updated URI.

The API request is received from a client device that in turn receives requested resources specified in the API request from the one or more resource providers, the client device having no information regarding which of the one or more resource providers is to receive the API request prior to receiving the requested resources from the one or more resource providers.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, workloads may be performed by various components of the system. To perform the workloads, various information may need to be obtained. Similarly, when workloads are performed various types of new information may become available for use.

The information (e.g., resources) used in the workloads may be available from various devices of the system. To facilitate management of this information, any of the devices of the system may host instances of application programming interfaces (APIs). The APIs may be used by other devices and/or applications (e.g., hosted by other or the same device) to obtain data that may include information usable in workloads. APIs may also be used to set, change, and/or configure data (e.g., write to one or more services and/or resource providers).

To facilitate ease of use, any of the APIs may be implemented as Representational State Transfer (REST) APIs. The REST APIs may associate uniform resource identifiers (URIs) with various resources (e.g., data sources). The resources may have various properties corresponding to different types of data available via the REST APIs. The data may be stored in a database which the REST APIs may receive when requests directed to the URIs are received.

For example, to utilize a REST API, a data consumer may generate a request that includes a URI. Once sent to a data source hosting the REST API, the request may be interpreted by identifying the resources specified by the URI, and obtaining corresponding data from a database. The data may be returned to service the request. If no properties are specified, then properties of the resource may be returned (similarly, if a property is not associated with data, then sub-properties of the property may be returned to enable a data consumer to identify properties relevant for use). Although this example specifically discusses the use of APIs for obtaining data, one of ordinary skill will appreciate that APIs may also be used for other functions such as, but not limited to, to set, change, and/or configure data (e.g., write to one or more services and/or resource providers).

In embodiments, the URI in the generated request (e.g., the REST API request) may by a short-form URI that includes a shared resource type name (e.g., host, vm, resource, storage-system, or the like) used by at least two different entities that provide services through the devices hosting the instances of the API. The at least two different entities may include a business entity and an information technology (IT) entity.

To accurately route the generated request to the correct instance of the API (e.g., assume here that the request is for an instance of the API provided and maintained by the business entity), a request routing mechanism is provided that determines where the API request should be routed using clues contained in the URI (e.g., one or more terms associated with only the instance of the API provided and maintained by the business entity) without requiring the URI to actually include the exact path (and/or explicitly laid out instructions or details) to the instance of the API provided and maintained by the business entity.

Thus, multiple entities (e.g., individuals, teams, corporations, external customers, or the like) sharing common access to the system may be able to submit short-form URIs with confidence that their API request will be routed to the correct (e.g., their desired) endpoint within the system for the API request to be serviced by the correct instance of a service.

To provide for the above noted functionality, the system of FIG. 1 may include client infrastructure 100, service infrastructure 110 and communication system 130. Each of these components is discussed below.

Client infrastructure 100 may provide desired computer implemented services. To do so, client infrastructure 100 may include any number of client devices (e.g., 102-104). The client devices may provide the computer implemented services cooperatively and/or individually.

To provide the computer implemented services, the client device may utilize information maintained by service infrastructure 110. To do so, the client devices may (i) invoke REST APIs hosted by service infrastructure 110 to obtain data, and (ii) use the obtained data to provide the computer implemented services.

Service infrastructure 110 may provide access to information used in the computer implemented services (e.g., service infrastructure 110 may be configured as a distributed service platform). To do so, service infrastructure 110 may host REST APIs, databases, and/or other data structures usable to store and provide access to stored information. Additionally, service infrastructure 110 include custom resource creation functionality through which custom resources may be established and used by other devices to access data maintained by service infrastructure 110.

To provide its functionality, service infrastructure 110 may include any number of service devices (e.g., 112-114) (also referred to herein as "resource providers"). The services devices (or resource providers) may provide access to information (e.g., data, services, resources, or the like) cooperatively or individually.

To more accurately route requests (e.g., API requests such as REST API requests) received from the client devices (e.g., 102-104) of the client infrastructure to a desired endpoint (e.g., a desired service provider), service infrastructure 110 may include a service device proxy 116 and a resource directory repository 118. The service device proxy 116 may use (e.g., obtain) information stored in the resource directly repository 118 to route requests received from the client infrastructure to one or more of the service devices (e.g., 112-114) for servicing of the requests.

Figures 2B, 2C:
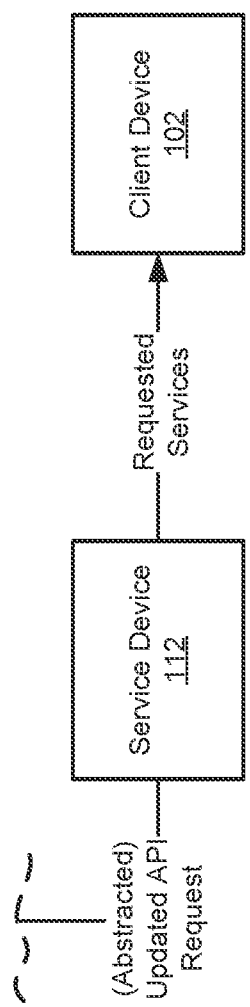
Figure 3:
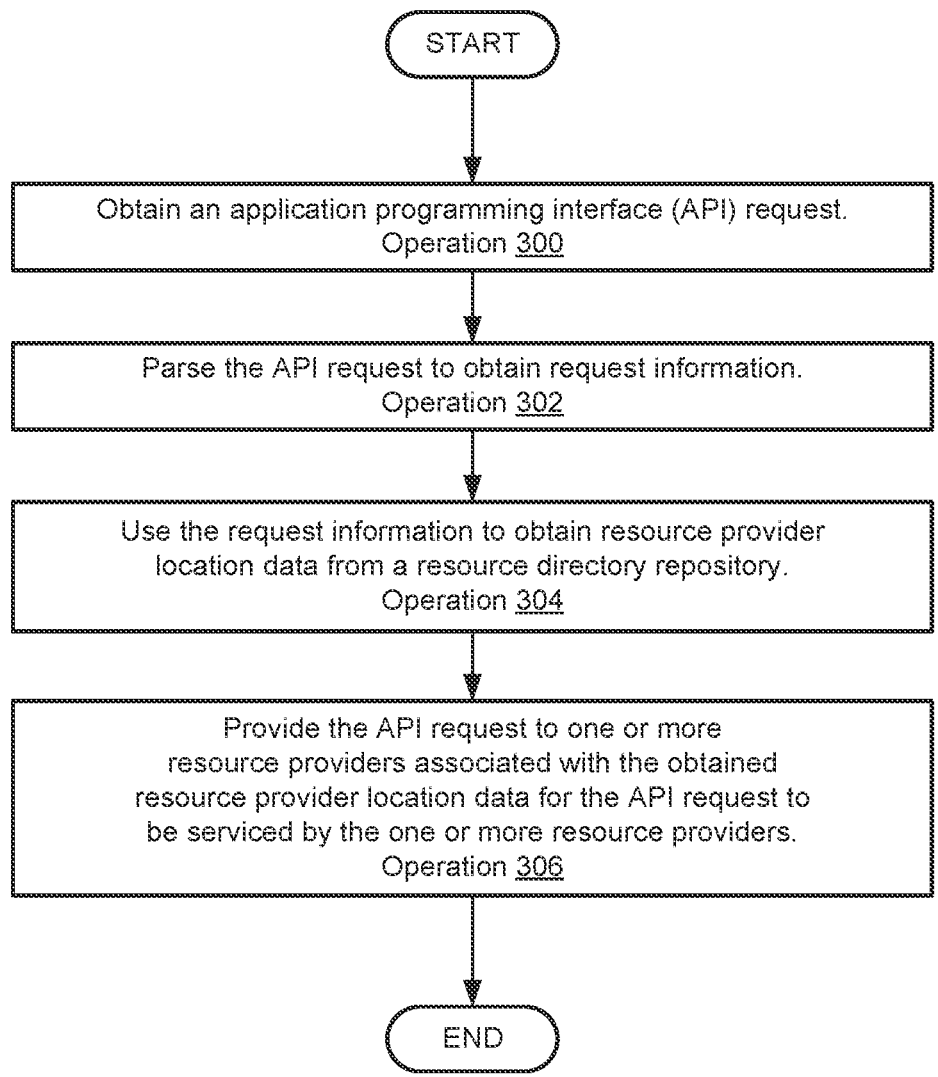
FIG. 3 shows a flow diagram illustrating a method in accordance with an embodiment.

When providing their functionality, any of the components of the client infrastructure 100 and service infrastructure 110 (and/or a portion thereof) may perform the flows and methods illustrated in FIGS. 2A-3.

Each of the components of the client infrastructure 100 (e.g., the client devices 102-104) and of the service infrastructure 110 (e.g., the service devices 112-114, the service device proxy 116, and the resource directory repository 118) may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

In embodiments, the service device proxy 116 may also be implanted as hardware, software, or a combination of both as part of each service device 112-114 and/or each client device 102-104. For example, an instance of the service device proxy 116 may be installed in each of the service devices 112-114 and/or in each of the client devices 102-104.

Additionally, although the service device proxy 116 and the resource directory repository 118 are shown as being part of the service infrastructure 110, these two components of the system of FIG. 1 may be implemented separately as remote devices (e.g., the resource directory repository 118 as a remote storage device separate from the service infrastructure 110) that are connected to the service infrastructure 110 via the communication system 130.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 209, etc.) is used to represent data structures, a second set of shapes (e.g., 202, 206, etc.) is used to represent processes performed using and/or that generate data, a third set of shapes (e.g., 208, etc.) is used to represent large scale data structures such as databases, and a fourth set of shapes (e.g., 102, 112, etc.) are used to represent computing devices (e.g., the computing devices discussed above in reference to FIG. 1). Shapes shown in broken lines may represent optional ones of the data structures, processes, large scale data structures, and/or the computing devices.

Turning to FIG. 2A, an application programming interface (API) request (e.g., a REST API request) may be generated by a client device 102. Alternatively, the API request may be obtained by the client device 102 from another source (e.g., another client device).

The API request may include at least: a URI; a Hypertext Transfer Protocol (HTTP) method (e.g., GET, POST, PUT, PATCH, DELETE, or the like); and one or more request parameters (e.g., a resource type name, resource ID (e.g., <id> in a URI), or the like (e.g., in a URI such as "/rest/v1/<resource type name>/<id>")); or the like. Other data commonly included in API requests may be included without departing from the scope of embodiments disclosed herein.

The URI may be a short-form URI that includes at least one common resource type name. A resource type name may be any of the common resource type names (that are shared among multiple resource providers) such as, but not limited to, host, vm, resource, storage-system) that is used by more than one entity that is hosting an instance (e.g., a version) of a service within a distributed service platform.

In embodiments, the API request 200 provided by the client device 102 may be ingested by a resource abstraction process 202. The resource abstraction process transforms the API request 200 into a common metadata framework (also referred to herein as a "predefined standardized format"). The common metadata framework may be a pre-set framework that is defined by one or more administrators of the distributed service platform. In embodiments, the abstracted API request may still include the shared resource type name. Additionally, the resource abstraction process 202 may be executed by any of the components (e.g., client devices 102-104, service devices 112-114, and/or service device proxy 116, or the like) of FIG. 1.

For example, if the distributed service platform is provided by a company A, the common metadata framework may be a framework specific to company A's preferences and set by one or more users of company A that are designated as administrators of company A's distributed service platform. Once abstracted into the common metadata framework, the API request may be presented in a format that is understandable by all teams (and/or individuals) within company A.

The resource abstraction process 202 may be implemented as a redirection layer. As a result, the API request is not actually processed (e.g., no code associated with any APIs are being executed) during the resource abstraction process 202.

In embodiments, the API request 200 (or the abstracted API request) may be ingested into a request routing process 206. The request routing process 206 may be executed by the service device proxy 116 of FIG. 1.

The request routing process 206 may parse the URI (e.g., the short-form URI) to identify all of the terms included within the URI. Alternatively, in some embodiments, certain terms (e.g., the shared resource type name) may be ignored when the URI is parsed as part of the request routing process 206. The terms parsed from the URI during the request routing process 206 may be used as identifiers that are used to retrieve information associated with a final endpoint (e.g., a service provider that will execute the API to fulfill the API request) for the API request.

In embodiments, the identifiers may include the HTTP method, the one or more request parameters, and other terms included in the URI. Using the identifiers, the request routing process 206 accesses a resource directory repository 208. The resource directory repository 208 may store one or more resource directories 209. Each resource directory 209 may be a data structure (e.g., a list, a table, or the like) storing information associated with an endpoint (e.g., one or more service devices that host one or more instances of APIs).

For example, information stored in the resource directory 209 may include: a host name of a service device (e.g., service device X), a resource name of a resource available through the service device, a resource type name of the resource, an action type (e.g., action associated with the HTTP method), a resource identifier (ID) (e.g., <id> in a URI such as "/rest/v1/<resource type name>/<id>"), and an offer identifier. Other information associated with services provided by one or more of the service devices that could be used to more accurately direct an API request to a correct instance of a service may also be included in the resource directly 209 without departing from one or more embodiments disclosed herein. In embodiments, each resource may have all three of a resource type name, a resource ID, and a resource name. A resource's name (e.g., a unique name created by an owner of the resource that may vary from resource to resource) and the resource's ID (e.g., also a unique identifier created by the owner the resource that may vary from resource to resource) may be different from the resource's resource type name.

In embodiments, the request routing process 206 may match the identifiers (e.g., terms) parsed from the URI to the information included in the resource directory 209 stored in the resource directory repository 208. Such matching of terms may be used to identify a path toward the correct instance of the API (e.g., the service device or devices hosting the correct of the API) required to service the API request. Such a path may be referred to herein as service device location data (herein also referred to as "resource provider location data") and comprises a host name of the service device(s) and a port number of the service device(s) that hosts the correct instance of the API that should be used to fulfil the API request.

Once the service device location data is retrieved from the resource directory repository 208, the original (or abstracted) API request 200 is updated (as part of request routing process 206) using the service device location data to obtain an updated API request (namely, an updated URI within the API request). For example, the URI may be modified to add the host name(s) and/or the port number(s) included in the service device location data.

The request routing process 206 then uses the updated URI that includes the added host name(s) and/or port number(s) to forward (e.g., route) the updated API request (original or abstracted) to one or more service devices 112-114 associated with the added host name(s) and/or port number(s) in the URI.

Turning now to FIG. 2B, once received by the service device(s) (e.g., service device 112), the updated service API request is processed by the receiving service device(s). Said another way, the updated service API request is fulfilled using the instance of the API hosted by the receiving service device(s). Once the updated service API request is fulfilled, the requested services are provided by the receiving service device(s) back to the client device 102 to complete the initial API request by the client device 102.

Turning now to FIG. 2C, FIG. 2C shows an example of a resource directory 209 that is stored in resource directory repository 208. As shown in this example, each entry of resource directory 209 specifies a resource provider (e.g., an endpoint) for an API request. Each resource provider may be associated with information (e.g., offer identifier, action, resource type, resource ID, or the like) that identifies the resource provider has the endpoint for an API request.

In embodiments, the resource name and the resource ID shown in the resource directory 209 of FIG. 2C may be terms that are unique to each unique instance of an API available in the distributed service platform. Said another way, these two pieces of information may likely be the key terms that ultimately determine where an API request should be routed. Namely, these terms may be uniquely defined by the entities (e.g., individuals, teams, customers, or the like) for a specific instance of an API and may not overlap with other similar terms used in other instances of an API. For example, a business entity providing instance A of API X may have a unique resource ID scheme different from the resource ID scheme of an IT entity providing instance B of the same API X.

As a result, assume that a URI (abstracted or original) reads "GET/storage-system/a". The term "storage-system" may be ignored since it is a shared resource type name while the term "GET" and "a" are used (e.g., by the request routing process 206) in combination with the resource directory 209 to retrieve the service device location data. Using the resource directory 209 shown in FIG. 2C, it can be seen that the terms "GET" and "a" are unique to "Service Device X" (e.g., resource provider X). Therefore, the service device location data will include the host name and/or the port number for "Service Device X". The original URI may then be updated to read "GET https://resource-provider-x/storage-systems/a" (or something similar) once the host name and/or port number of "Service Device X" are added to the original URI.

Using the updated URI, the API request is then routed to Service Device X where the correct instance of an API for fulfilling the API request is located (e.g., instantiated, maintained, available, etc.).

In embodiments, based on the information stored in the resource directory 209, the API request may be routed to more than one endpoint (e.g., resource provider). For example, consider an API request for accessing a list of resources "R" (e.g., URI of "GET/R"). If more than one endpoint (e.g., resource provider) stores resource "R", the API request will be routed (e.g., as multiple separate requests) to each of the endpoint storing resource "R".

As discussed above, the components of FIG. 1 may perform various methods to manage operation of data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing resources in a distributed service platform in accordance with an embodiment is shown. The method may be performed by any of the components shown in client infrastructure 100 and service infrastructure 110 of FIG. 1.

At operation 300, an API request may be obtained.

For example, as discussed above inference to FIG. 2A, the API request may be obtained by a service device proxy 116 as an original (or abstracted) API request. In embodiments, the API request may be received from a client device that in turn receives requested services (and/or requested resources) specified in the API request from one or more service devices. The client device may not have (e.g., store, have access to, etc.) any information regarding which of the one or more service devices is to receive the API request prior to receiving the requested services (and/or requested resources) from the one or more service devices. Said another way, at the creation of the API request, neither the client device nor the user creating the request knows which service device(s) will receive the API request (e.g., which service device(s) have the correct instances of an API that is to fulfil the API request).

In operation 302, as discussed above in reference to FIG. 2A, the API request (original or abstracted) may be parted to obtain request information (e.g., the identifiers discussed in FIG. 2A).

In operation 304, as discussed above in reference to FIG. 2A, the request information (e.g., identifiers) included the API request may be used to obtain service device location data (e.g., as part of request routing process 206 of FIG. 2A) from a resource directory repository storing one or more resource directories.

In embodiments, the service device location data comprises the host name and a port number of each of the one or more services (e.g., service devices) to which the API request is to be provided (e.g., routed).

In embodiments, providing the API request to the one or more service devices may include, for a service device among the one or more service devices: adding the host name of the service device to the URI included in the API request to obtain an updated URI; and forwarding the API request to the service device of the one or more service devices using the updated URI.

In operation 306, the API request (e.g., the updated API request including the service device location data) may be provided (e.g., routed) to one or more service devices associated with the obtained service device location data for the API request.

Once the API request is obtained by the one or more service devices, the API request is serviced by the one or more service devices such that the services included in the API request is provided back to the client device that transmitted (and/or generated) the original API request.

The method may end following operation 306.

Figure 4:
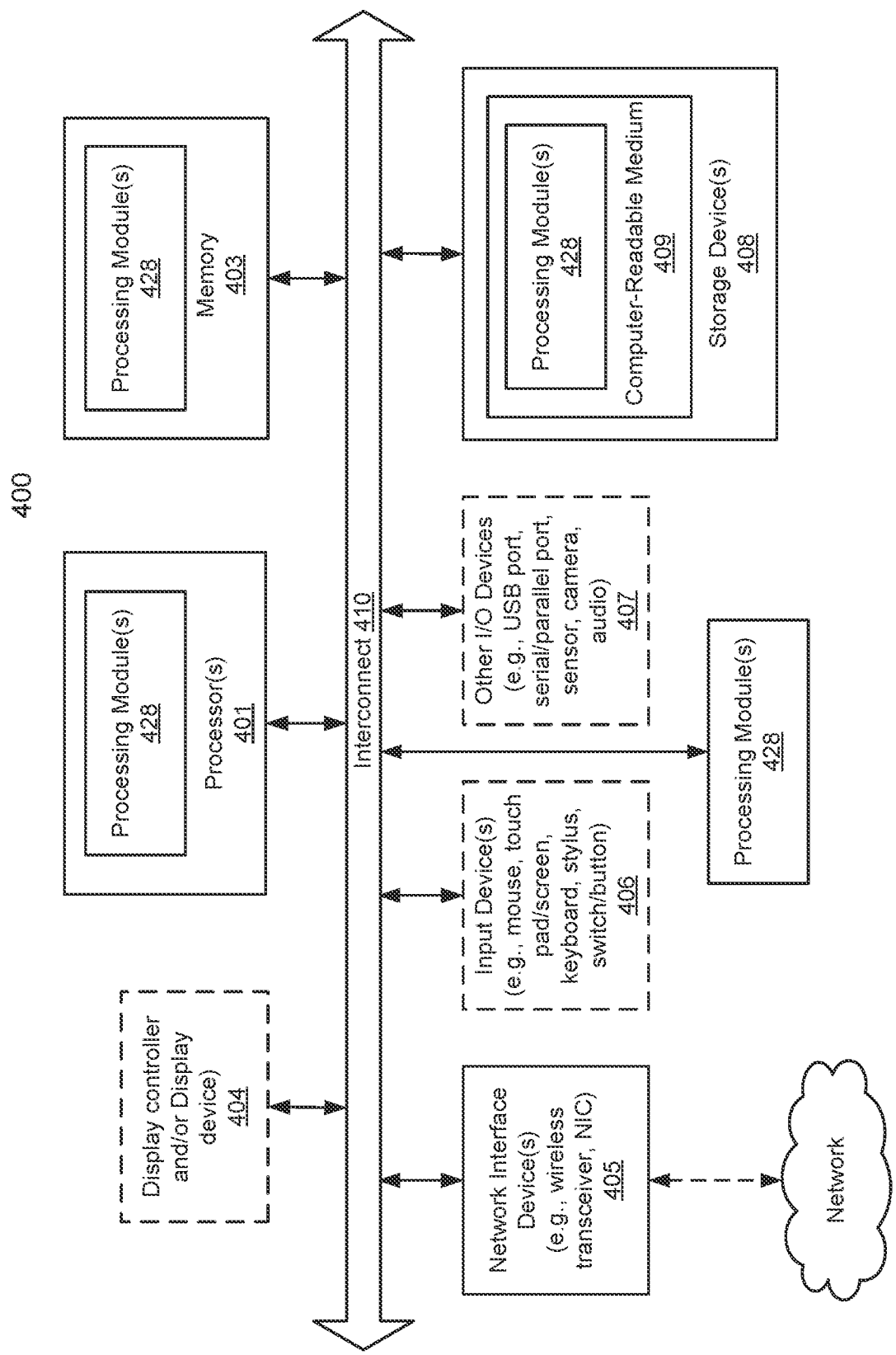
FIG. 4 shows a block diagram illustrating a data processing system in accordance with an embodiment.

Any of the components illustrated in FIGS. 1-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing resources within a distributed service platform, the method comprising:
    obtaining an application programming interface (API) request;
    parsing the API request to obtain request information, the request information comprising a uniform resource identifier (URI), and the URI being a short-form URI;
    using the request information to obtain resource provider location data from a resource directory repository; and
    providing the API request to one or more resource providers associated with the obtained resource provider location data for the API request to be serviced by the one or more resource providers.

2. The method of claim 1, wherein the API request is a Representational State Transfer (REST) API request, and a term in the short-form URI is a shared resource type name used by at least two different entities that provide resources through the one or more resource providers.

3. The method of claim 2, wherein the at least two different entities comprise a business entity and an information technology (IT) entity, and the shared resource type name is one selected from a group consisting of: host, resource, virtual machine (vm), and storage-system.

4. The method of claim 2,
    wherein the resource directory repository stores a resource directory, the resource directory including information associated with the one or more resource providers comprising, for each of the one or more resource providers: a host name, a resource ID, a resource name, an action type, and an offer ID, and
    wherein using the request information to obtain the resource provider location data comprises:
        matching terms included in the URI to the information associated with the one or more resource providers included in the resource directory.

5. The method of claim 4, wherein the API request is an abstracted API request on which a resource abstraction process was previously applied before being obtained, the resource abstraction process modifies content within the API request to adhere to a predefined standardized format.

6. The method of claim 5, wherein
    the resource provider location data comprises the host name and a port number of each of the one or more resource providers to which the API request is to be provided, and
    providing the API request to the one or more resource providers comprises, for a resource provider among the one or more resource providers:

updating the host name of the resource provider to the URI included in the API request to obtain an updated URI; and forwarding the API request to the resource provider of the one or more resource providers using the updated URI.

7. The method of claim 6, wherein the API request is received from a client device that in turn receives requested resources specified in the API request from the one or more resource providers, the client device having no information regarding which of the one or more resource providers is to receive the API request prior to receiving the requested resources from the one or more resource providers.

8. A non-transitory machine-readable medium having instructions stored therein, which when executed by a processor, cause the processor to perform operations for managing resources within a distributed service platform, the operations comprising:

obtaining an application programming interface (API) request;

parsing the API request to obtain request information, the request information comprising a uniform resource identifier (URI), and the URI being a short-form URI;

using the request information to obtain resource provider location data from a resource directory repository; and providing the API request to one or more resource providers associated with the obtained resource provider location data for the API request to be serviced by the one or more resource providers.

9. The non-transitory machine-readable medium of claim 8, wherein the API request is a Representational State Transfer (REST) API request, and a term in the short-form URI is a shared resource type name used by at least two different entities that provide resources through the one or more resource providers.

10. The non-transitory machine-readable medium of claim 9, wherein the at least two different entities comprise a business entity and an information technology (IT) entity, and the shared resource type name is one selected from a group consisting of: host, resource, virtual machine (vm), and storage-system.

11. The non-transitory machine-readable medium of claim 9, wherein the resource directory repository stores a resource directory, the resource directory including information associated with the one or more resource providers comprising, for each of the one or more resource providers: a host name, a resource ID, a resource name, an action type, and an offer ID, and wherein using the request information to obtain the resource provider location data comprises:

matching terms included in the URI to the information associated with the one or more resource providers included in the resource directory.

12. The non-transitory machine-readable medium of claim 11, wherein the API request is an abstracted API request on which a resource abstraction process was previously applied before being obtained, the resource abstraction process modifies content within the API request to adhere to a predefined standardized format.

13. The non-transitory machine-readable medium of claim 12, wherein the resource provider location data comprises the host name and a port number of each of the one or more resource providers to which the API request is to be provided, and providing the API request to the one or more resource providers comprises, for a resource provider among the one or more resource providers:

updating the host name of the resource provider to the URI included in the API request to obtain an updated URI; and forwarding the API request to the resource provider of the one or more resource providers using the updated URI.

14. The non-transitory machine-readable medium of claim 13, wherein the API request is received from a client device that in turn receives requested resources specified in the API request from the one or more resource providers, the client device having no information regarding which of the one or more resource providers is to receive the API request prior to receiving the requested resources from the one or more resource providers.

15. A data processing system comprising:

a processor; and a memory, wherein the memory stores instructions that when executed by a processor cause the processor to perform operations for managing resources within a distributed service platform, the operations comprising:

obtaining an application programming interface (API) request;

parsing the API request to obtain request information, the request information comprising a uniform resource identifier (URI), and the URI being a short-form URI;

using the request information to obtain resource provider location data from a resource directory repository; and providing the API request to one or more resource providers associated with the obtained resource provider location data for the API request to be serviced by the one or more resource providers.

16. The data processing system of claim 15, wherein the API request is a Representational State Transfer (REST) API request, and a term in the short-form URI is a shared resource type name used by at least two different entities that provide resources through the one or more resource providers.

17. The data processing system of claim 16, wherein the at least two different entities comprise a business entity and an information technology (IT) entity, and the shared resource type name is one selected from a group consisting of: host, resource, virtual machine (vm), and storage-system.

18. The data processing system of claim 16, wherein the resource directory repository stores a resource directory, the resource directory including information associated with the one or more resource providers comprising, for each of the one or more resource providers: a host name, a resource ID, a resource name, an action type, and an offer ID, and wherein using the request information to obtain the resource provider location data comprises:

matching terms included in the URI to the information associated with the one or more resource providers included in the resource directory.

19. The data processing system of claim 18, wherein the API request is an abstracted API request on which a resource abstraction process was previously applied before being obtained, the resource abstraction process modifies content within the API request to adhere to a predefined standardized format.

20. The data processing system of claim 19, wherein
the resource provider location data comprises the host name and a port number of each of the one or more resource providers to which the API request is to be provided, and
providing the API request to the one or more resource providers comprises, for a resource provider among the one or more resource providers:
updating the host name of the resource provider to the URI included in the API request to obtain an updated URI; and
forwarding the API request to the resource provider of the one or more resource providers using the updated URI.

* * * * *